United States Patent [19]

Kitayama

[11] Patent Number: 4,775,213
[45] Date of Patent: Oct. 4, 1988

[54] COMPOSITE OVERHEAD STRANDED CONDUCTOR HAVING A FILLER BETWEEN OPTICAL FIBERS AND A PROTECTIVE TUBE

[75] Inventor: Yoshinobu Kitayama, Kanagawa, Japan

[73] Assignee: Sumitomo Electric Industries, Ltd., Osaka, Japan

[21] Appl. No.: 880,963

[22] Filed: Jul. 1, 1986

[30] Foreign Application Priority Data

Jul. 17, 1985 [JP] Japan .......................... 60-109513[U]

[51] Int. Cl.⁴ ............................................... G02B 6/44
[52] U.S. Cl. ................................................. 350/96.23
[58] Field of Search ..................................... 350/96.23

[56] References Cited

U.S. PATENT DOCUMENTS

| 4,141,622 | 2/1979 | Beal .................................. 350/96.23 |
| 4,156,104 | 5/1979 | Mondello ..................... 350/96.23 X |
| 4,408,828 | 10/1983 | Le Noane et al. ............... 350/96.23 |
| 4,491,386 | 1/1985 | Negishi et al. .................... 350/96.23 |
| 4,657,343 | 4/1987 | Oldham et al. ................... 350/96.23 |
| 4,671,610 | 6/1987 | Kitayama et al. ................. 350/96.23 |

FOREIGN PATENT DOCUMENTS

| 85108068 | 7/1985 | China . |
| 0146757 | 7/1985 | European Pat. Off. ......... 350/96.23 |
| 2511161 | 2/1983 | France .............................. 350/96.23 |
| 0001643 | 1/1979 | Japan ............................... 350/96.23 |
| 0054407 | 5/1981 | Japan ............................... 350/96.23 |
| 57-44107 | 3/1982 | Japan . |
| 0115504 | 7/1982 | Japan ............................... 350/96.23 |
| 58-10703 | 1/1983 | Japan . |
| 58-7607 | 1/1983 | Japan . |
| 60-24510 | 2/1985 | Japan . |
| 62-2412 | 8/1987 | Japan . |
| 2082790 | 3/1982 | United Kingdom ............. 350/96.23 |

Primary Examiner—William L. Sikes
Assistant Examiner—Akm E. Ullah
Attorney, Agent, or Firm—Sughrue, Mion, Zinn, Macpeak & Seas

[57] ABSTRACT

A composite stranded conductor bundle in which one of the cable strands is a fiber optic unit having a protective tube enclosing a plurality of optical fibers. The protective tube is filled with a fiber filler to hold the optical fibers.

5 Claims, 1 Drawing Sheet

COMPOSITE OVERHEAD STRANDED CONDUCTOR HAVING A FILLER BETWEEN OPTICAL FIBERS AND A PROTECTIVE TUBE

BACKGROUND

1. Field of the Invention

This invention relates to the structure of a composite overhead stranded conductor bundle in which optical fibers are inserted in an overhead electric wire or overhead ground wire.

2. Background Art

FIG. 1 is a section view showing the structure of a conventional composite overhead stranded conductor bundle. A plurality of optical fibers 1 are stranded around a tension member 2, and are then covered by a sheath 3, to form an optical fiber cable 4. The optical fiber cable 4 thus formed is inserted into an optical fiber protective tube 5, to provide an optical fiber unit 6. Aluminum-clad steel wires 7 are stranded around the optical fiber unit 6. Put another way, the optical unit 6 includes optical fiber cable 4 and a protective tube 5 housing therein the cable 4. The optical fiber cable 4 includes a tension member 2, a plurality of optical fibers 1 stranded around tension member 2, and a sheath 3 formed over the stranded optical fibers 1.

As is apparent from the above description, in the conventional composite overhead stranded conductor bundle, there is a gap between the optical fiber cable and the optical fiber protective tube, and therefore the optical fiber cable can be readily moved inside the protective tube. However, the movement of the optical fiber cable fluctuates because the friction between the optical fiber cable and the inner wall of the optical fiber protective tube is not uniform in the longitudinal direction. Furthermore, the movement fluctuates because of the bending of the composite overhead stranded conductor bundle. On the other hand, in general, a composite overhead stranded conductor bundle is exposed to quite severe conditions, such as temperature change, vibration and expansion, as compared with an ordinary communication cable. Accordingly, in the case when external stress such as expansion or contraction is applied to the conventional composite overhead stranded conductor bundle of FIG. 1, the fluctuation of the longitudinal friction between the optical fiber cable and the optical fiber protective tube variably affects the movement of the optical fiber cable in the longitudinal direction. As a result, stress is locally applied to the optical fiber cable as, for instance, when the optical fiber cable is slackened or bent, whereby the optical fiber transmission loss may be increased or the cable may be broken.

SUMMARY OF THE INVENTION

Accordingly, an object of the invention is to provide a composite overhead stranded conductor bundle in which the optical fibers in the bundle do not suffer a transmission loss nor break due to bending.

Another object is to prevent the movement of the optical fibers within the bundle.

In a compound optical fiber for overhead use, a stranded conductor bundle includes an optical fiber unit, itself including one or more fibers and these optical fiber units are covered by an optical fiber protective tube. According to the invention, the gaps formed inside the tube are filled with a fiber filler so that the bending of the optical fibers or optical fiber cable is prevented. Thus, an increase of transmission loss is prevented.

As described above, in the composite overhead stranded conductor bundle according to the invention, the gaps formed inside the optical fiber protective tube are filled with fibers. Therefore, the movement of the optical fibers relative to the conductors is prevented, and the optical fibers are relatively free from local stress and bending. Accordingly, any increase of the transmission loss is prevented, and the composite line is maintained high in reliability for a long period.

Now, the invention will be described with reference to the accompanying drawings.

DETAILED DESCRIPTION OF THE PREFERRED EMBODIMENTS

Figure 1:
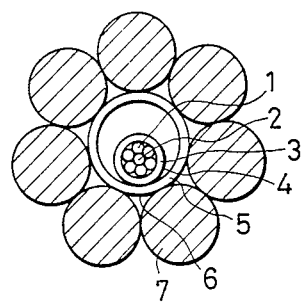
FIG. 1 is a sectional view showing the structure of a conventional composite overhead stranded conductor bundle.
Figure 2:
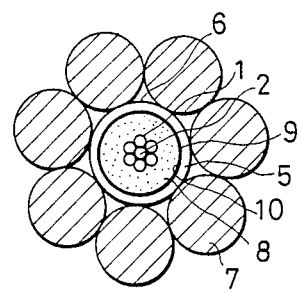
FIG. 2 is a sectional view showing the structure of one example of composite overhead stranded conductor bundle according to this invention.

FIG. 2 is a sectional view of a first example of a composite overhead stranded conductor according to this invention. A plurality of optical fibers 1 are stranded around a tension member 2, and are then covered with a filler 8 which is, for instance, of "Kevlar" fibers. Kevlar is a trademark of the Du Pont Corporation for an aromatic polyamide. A thin tape 9 is wound on the filler 8 to form an optical fiber cable 10. Next, the thus formed optical fiber cable 10 is inserted into the optical fiber protective tube 5, to form an optical fiber unit 6. This insertion process is for example performed by laying the optical fiber cable 10 into a longitudinally disposed sheet and then bending the sheet around the circumference of the optical fiber cable 10 and sealing the longitudinally extending ends to form the protective tube 5. The process can be performed by continuous automatic equipment. After sealing the longitudinally extending ends of the sheet, the sheet is compressed radially inwardly to the extent that the inner diamter of the sheet is approximately equal to the outer diameter of the optical fiber cable 10, to thereby form the protective tube 5 tightly over the cable 10. A plurality of aluminum-clad steel wires 7 are stranded around the optical fiber unit 6 thus formed, to provide the composite overhead stranded conductor bundle.

It is preferable that the material of the filler 8 is flexible and resilient, in order to alleviate external mechanical stress such as collapsing force. In addition to the above-described Kevlar fibers, glass fibers, Kaynol fibers, or the like can be employed as the filler 8.

Figure 3:
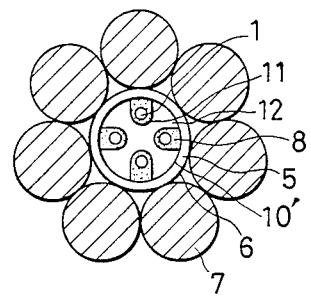
FIG. 3 is a sectional view showing the structure of another example of the composite overhead stranded conductor bundle according to the invention.

FIG. 3 is a sectional view of a second example of the composite overhead stranded conductor bundle according to the invention. The bundle comprises a spacer type optical fiber cable 10' which is formed by inserting optical fibers 1 in the spiral grooves of a grooved spacer 12. In the second example, the spiral grooves 11 are formed in the outer wall of the spacer 12. The remaining area in the spiral grooves 11 are filled with a filler 8 which is composed, for instance, of Kevlar fibers. In the second embodiment, at least two optical fibers can be positioned in respective spiral grooves 11. Preferably, the filler 8 completely separates the optical fiber from the spacer 12. The spiral-grooved spacer 12 is covered by an optical fiber protective tube 5 so that the aforementioned spacer type optical fiber cable 10' is formed to provide an optical fiber unit 6. Aluminum-clad steel wires 7 are stranded around the optical fiber unit 6 to form the composite overhead stranded conductor bundle. The gaps formed in the spiral grooves 11 covered by the protective tube 5 are filled with the filler 8.

As was described above, in the composite overhead stranded conductor bundle according to the invention, the optical fibers or optical fiber cable is at most moderately strained within the optical fiber protective tube to the extent that no micro-bend losses are produced. Therefore, the optical fibers or optical fiber cable will never be displaced in the longitudinal direction in the line, and is relatively free from local stress. Therefore, the composite overhead stranded conductor offers high reliability over a long period. For the same reason, the optical fibers are relatively free from bending, and therefore increase in the transmission loss due to the bending of the optical fibers can be prevented. These effects of the invention should be highly advantageous.

In the composite overhead stranded conductor of the invention, the optical fibers or optical fiber cable is separated from the spacer and the protective tube by the filler. Therefore, in the event that the temperature of the cable is abruptly increased for instance when the cable is short-circuited or struck by lightning, transmission of the high temperature to the optical fibers is substantially prevented by the filler, that is, the filler serves as a heat insulation layer.

I claim:

1. A composite overhead stranded conductor comprising:
    a centrally disposed optical fiber unit; and
    a plurality of conductors stranded over said optical fiber unit;
    said optical fiber unit comprising;
    an optical fiber cable including a plurality of optical fibers,
    an optical fiber protective tube formed over said optical fiber cable,
    a spacer member formed with a plurality of spiral grooves at its outer peripheral surface, said spacer member positioned internally of said optical fiber protective tube, said plurality of optical fibers being positioned in respective ones of said spiral grooves, and
    a filler filled within said spiral grooves and consisting of flexible, resilient fibers.

2. A composite overhead stranded conductor comprising: a centrally disposed optical fiber unit; and a plurality of conductors stranded over said optical fiber unit; said optical fiber unit comprising; an optical fiber cable including a plurality of optical fibers, an optical fiber protective tube formed over said optical fiber cable, a spacer member formed with a plurality of spiral grooves at its outer peripheral surface, said spacer member being positioned within said optical fiber protective tube, at least two of said plurality of optical fibers being positioned in respective ones of said spiral grooves, and a filler filled within said spiral grooves, said filler consisting of flexible, resilient fibers.

3. A composite overhead stranded conductor as claimed in claim 1 or 2, wherein said filler separates substantially all portions of said optical fibers from a surface of said spiral grooves and an inner surface of said protective tube.

4. A composite overhead stranded conductor as claimed in claim 3, wherein said filler comprises aromatic polyamide fibers.

5. A composite overhead stranded conductor as claimed in claim 1 or 2, wherein said fibers comprises aromatic polyamide fibers.

* * * * *